T. C. LUCE.
SPROCKET DRIVING DEVICE.
APPLICATION FILED JULY 7, 1915.
1,201,748.
Patented Oct. 17, 1916.
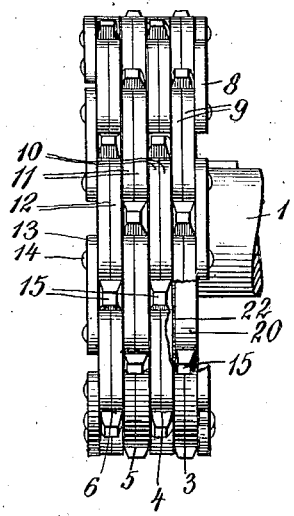
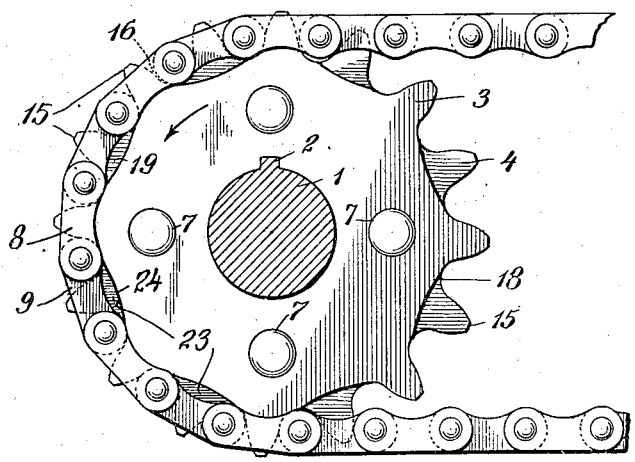
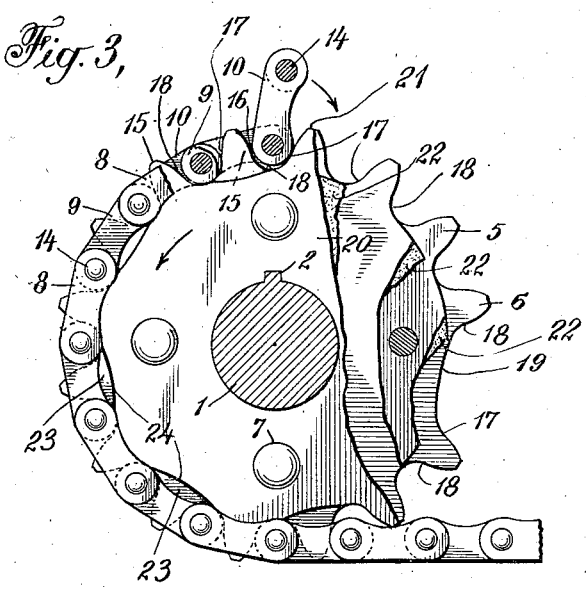
WITNESSES
Charles Eberhart
Jessie B. Kay
Thomas C Luce  INVENTOR
BY
Harry L Duncan  ATTORNEY.

UNITED STATES PATENT OFFICE.

THOMAS C. LUCE, OF STRATFORD, CONNECTICUT, ASSIGNOR TO AMERICAN CHAIN COMPANY, INCORPORATED, OF BRIDGEPORT, CONNECTICUT, A CORPORATION OF NEW YORK.

SPROCKET DRIVING DEVICE.

1,201,748.  Specification of Letters Patent.  Patented Oct. 17, 1916.

Application filed July 7, 1915. Serial No. 38,607.

*To all whom it may concern:*

Be it known that I, THOMAS C. LUCE, of Stratford, Fairfield county, Connecticut, have made a certain new and useful Invention Relating to Sprocket Driving Devices, of which the following is a specification, taken in connection with the accompanying drawing, which forms part of the same.

This invention relates especially to sprocket wheel and chain constructions in which the sprocket wheel may be made up in sections having alternating rows of teeth that are circumferentially spaced midway, for instance, between the teeth of the adjacent rows. The sprocket chain may be made up of pivoted links which are arranged in staggered relation to each other so that the openings or spaces between the alternating rows of links are longitudinally spaced midway between the spaces of the adjacent rows. The sprocket wheel thus has a pitch of only one-half the effective length of each link and all of the sprocket teeth have lateral guiding action as well as being effective for driving purposes, the teeth being preferably formed with front sockets which closely engage the trailing ends of the links while the links are preferably of such length as to have their leading ends free from the sockets on the rear sides of the sprocket teeth so as to allow the free pivoting or swinging of the links and minimize friction.

In the accompanying drawing showing in a somewhat diagrammatic way an illustrative embodiment of this invention, Figure 1 is an end elevation of a sprocket wheel and chain. Fig. 2 is a side elevation thereof; and Fig. 3 is a similar view showing parts in section for greater clearness.

The sprocket wheel may be formed with different rows of teeth which are circumferentially spaced apart in the different rows and a convenient arrangement is to have the alternating rows of teeth circumferentially spaced midway between the teeth of the other rows.

The sprocket teeth which may have any suitable form and construction may be formed on the sprocket wheel in any desired way and one convenient way of forming the sprocket wheel is to build it up in sections each extending around the shaft and carrying a single circumferential row of sprocket teeth. Figs. 1 and 3 show such an arrangement, the steel or other plates of which the sprocket wheel sections are formed being of such thickness as to accommodate a single row of sprocket teeth, such as 3, 4, 5, 6, and having bodies 20 which may with advantage have sheets 22 of thick paper or thin vulcanized fiber, etc., interposed between them to minimize noise and give a little more clearance between adjacent rows of teeth. These sprocket sections may be formed with recesses 24 between adjacent teeth so as to provide the clearance spaces 23 beneath the chain links and assist the working out and elimination of dirt, etc., and they may be formed with a suitable central aperture and key-way to accommodate the shaft 1 and key 2 which may be formed thereon in any suitable way. These sprocket sections may be rigidly connected together in any suitable way as by a series of rivets 7 extending longitudinally through the entire sprocket wheel and firmly holding the sections and their teeth in proper alinement.

The sprocket chain is made up of links which may be single or multiple, and which are connected together in staggered relation so that the spaces or apertures between the links with which the sprocket teeth coöperate are preferably longitudinally spaced midway between the apertures of the adjacent rows of links. As shown in Fig. 1 each of the regular links 9, 10, 11 and 12 may be duplex, that is, formed of a double plate of sheet steel or other suitable material of the desired shape which facilitates ease of manufacture and the edge or guard links 8 and 13 may, if desired, be of less thickness and may be conveniently formed of a single link element. These links are connected together in staggered relation by suitable pivot connections of any desired character which may be of a knife edge or other anti-friction type, if desired, although in the drawing the pivots 14 are shown of the ordinary solid or cylindrical type.

The shape and size of the links is so arranged with respect to the shape of the sprocket teeth as to secure proper coöperation therewith and preferably accommodate slight lengthening of the links without destroying alinement. If desired, the links may be formed with substantially circular ends as shown in Fig. 3 and the sprocket may be formed with teeth having sockets 18 of circular shape on their rear sides and similar circular sockets 17 on the forward sides of each of the teeth.

Under normal operating conditions, assuming that the sprocket shown in Fig. 3 is driving, the trailing ends of the links seat themselves solidly in the circular forward sockets 17 as is shown, for instance, by the full line trailing end of the link 10 in that figure. The length of the links is made such that the leading end of the link has sufficient clearance so as to be at least substantially free and out of contact with the rear sockets 18 of the sprocket teeth, this clearance being somewhat exaggerated and being shown as the free space 16 in Figs. 2 and 3. Thus after the trailing end of a link has seated itself in one of the forward sockets the connected link behind is then free to swing without substantial friction against the teeth or sockets so as to bring its rear end into bearing engagement, the friction thus being minimized and practically limited to the turning friction between the links and their pivots, since also the bottoms 19 of the seats between the sprocket teeth are not engaged by the links. This is illustrated by the free upturned end of the last link 10 which as indicated is free to swing about its pivot without engaging the rear socket 18 during the turning movement in the direction indicated by the arrow, this link being laterally out of line with the sprocket teeth 21 to the rear so as not to substantially engage the same during this turning movement. The extent of the normal turning of these links about their pivots is of course much less than this under normal operating conditions, the last link being indicated in this position to more clearly show that this turning movement can take place without friction against the rear sockets as the links slide down between the adjacent teeth to the rear. It is also possible in this way to render effective practically all of the links of the sprocket chain both for maintaining the lateral alinement of the chain on the sprocket wheel and for driving purposes and the construction has other manifest advantages because of its simplicity and strength.

This invention has been disclosed in connection with a number of illustrative embodiments, forms, arrangements, proportions and shapes of parts and materials, to the details of which disclosure the invention is not of course to be limited, since—

What is claimed as new and what is desired to be secured by Letters Patent is set forth in the appended claims.

1. In sprocket chain devices, a sprocket wheel formed of a series of sections each having one circumferential row of sprocket teeth formed thereon, rivets rigidly securing said sections together so that the sprocket teeth of alternate rows are circumferentially spaced midway between the teeth of the other rows, and a coöperating sprocket chain having multiple links each formed of a plurality of similar plates, said links being pivotally connected in staggered relation so that the openings between adjacent links in alternate rows are longitudinally spaced midway between the openings between the adjacent links of the other rows, said links being formed with substantially circular ends and said sprocket teeth having substantially circular sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

2. In sprocket chain devices, a sprocket wheel formed of a series of sections each having one circumferential row of sprocket teeth formed thereon, said sections being rigidly secured together so that the sprocket teeth of alternate rows are circumferentially spaced midway between the teeth of the other rows, and a coöperating sprocket chain having links pivotally connected in staggered relation so that the openings between adjacent links in alternate rows are longitudinally spaced midway between the openings between the adjacent links of the other rows, said links being formed with substantially circular ends and said sprocket teeth having substantially circular sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

3. In sprocket chain devices, a sprocket wheel formed of a series of sections each having one circumferential row of sprocket teeth formed thereon, said sections being rigidly secured together so that the sprocket teeth of alternate rows are circumferentially spaced between the teeth of the other rows, and a coöperating sprocket chain having links pivotally connected in staggered relation so that the openings between adjacent links in alternate rows are longitudinally spaced between the openings between the adjacent links of the other rows, and said sprocket teeth having sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

4. In sprocket chain devices, a sprocket wheel having the sprocket teeth of alternate rows circumferentially spaced midway between the teeth of the other rows, and a coöperating sprocket chain having links, pivots connecting said links in staggered relation so that the openings between adjacent links in alternate rows are longitudinally spaced midway between the openings between the adjacent links of the other rows, said links being formed with substantially circular ends and said sprocket teeth having substantially circular sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

5. In sprocket chain devices, a sprocket wheel having the sprocket teeth of alternate rows circumferentially spaced midway between the teeth of the other rows, and a coöperating sprocket chain having links connected in staggered relation so that the openings between adjacent links in alternate rows are longitudinally spaced midway between the openings between the adjacent links of the other rows, said sprocket teeth having sockets on their front and rear sides so that the trailing ends of the links can seat themselves in the forward sockets of said teeth of the driving sprockets while the leading ends of the connected links are free from the rear sockets of the sprocket teeth ahead and free to swing about their pivots with a minimum of friction.

6. In sprocket chain devices, a sprocket wheel having sprocket teeth of alternate rows circumferentially spaced between the teeth of another row, and a coöperating sprocket chain having links connected in staggered relation so that the openings between adjacent links in alternate rows are longitudinally spaced intermediate the openings between the links of an adjacent row, said sprocket teeth having sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

7. In sprocket chain devices, a sprocket wheel having a plurality of rows of sprocket teeth, the teeth in each row being spaced midway between the teeth of an adjacent row, and a coöperating sprocket chain having a plurality of rows of links connected in staggered relation so that the openings between adjacent links in each row are longitudinally spaced midway between the openings between the links of an adjacent row, said sprocket teeth having sockets on their front and rear sides so that the trailing ends of the links can seat themselves in the forward sockets of said teeth of the driving sprocket while the leading ends of the connected links are free from the rear sockets of the sprocket teeth ahead and free to swing about their pivots with a minimum of friction.

8. In sprocket chain devices, a sprocket wheel having a plurality of rows of sprocket teeth, the teeth in each row being circumferentially spaced between the teeth of an adjacent row, and a coöperating sprocket chain having a plurality of rows of links connected in staggered relation so that the openings between adjacent links in each row are longitudinally spaced intermediate the openings between the links of an adjacent row, said sprocket teeth having link engaging portions on their front and rear sides so that the trailing ends of the links can seat themselves in the forward link engaging portions of said teeth of the driving sprocket while the leading ends of the connected links are free from the rear link engaging portions of the sprocket teeth ahead and free to swing about their pivots with a minimum of friction.

THOMAS C. LUCE.